US008783920B1

(12) United States Patent
Mohktari Sharghi

(10) Patent No.: US 8,783,920 B1
(45) Date of Patent: Jul. 22, 2014

(54) SYSTEMS FOR INDICATING VISIBILITY OF A BLIND SPOT TO A DRIVER

(71) Applicant: Shahriar Mohktari Sharghi, New York, NY (US)

(72) Inventor: Shahriar Mohktari Sharghi, New York, NY (US)

( * ) Notice: Subject to any disclaimer, the term of this patent is extended or adjusted under 35 U.S.C. 154(b) by 0 days.

(21) Appl. No.: 14/146,200

(22) Filed: Jan. 2, 2014

Related U.S. Application Data

(60) Provisional application No. 61/748,104, filed on Jan. 1, 2013.

(51) Int. Cl.
*B60R 1/00* (2006.01)
*B60R 1/12* (2006.01)

(52) U.S. Cl.
CPC ... *B60R 1/12* (2013.01); *B60R 1/00* (2013.01); *B60R 1/006* (2013.01)
USPC .......................................................... 362/487

(58) Field of Classification Search
None
See application file for complete search history.

(56) References Cited

U.S. PATENT DOCUMENTS 5,668,675 A * 9/1997 Fredricks ...................... 359/843
5,993,015 A 11/1999 Fredricks
6,176,587 B1 1/2001 Fredricks
6,501,536 B1 12/2002 Fredricks
6,547,405 B2 4/2003 Jacobs
6,598,982 B2 7/2003 Witt
7,859,432 B2 12/2010 Kim et al.
8,004,741 B2 8/2011 Tonar et al.
8,378,802 B2 2/2013 Hwang
2012/0200428 A1 8/2012 Lynam
2013/0049986 A1 2/2013 Foote et al.
2013/0093581 A1 4/2013 Arai

* cited by examiner

*Primary Examiner* — Britt D Hanley

(74) *Attorney, Agent, or Firm* — Byrne Poh LLP

(57) ABSTRACT

Systems for indicating visibility of a blind spot to a driver are provided. In some embodiments, the systems comprise: a housing; a mirror coupled to the housing, wherein the mirror is adjustable in at least a horizontal direction with respect to the housing; and a directional light source rigidly coupled to the housing such that a direction of the light source is substantially parallel to at least a portion of a typical driver's blind spot during operation of a vehicle to which the side mirror assembly is coupled, wherein the direction of the light source is angled with respect to the housing such that light emitted by the light source is reflected by the mirror into a passenger compartment of the vehicle to which the side mirror assembly is coupled in at least two positions of the mirror separated by at least ten degrees of horizontal rotation of the mirror.

16 Claims, 3 Drawing Sheets

SYSTEMS FOR INDICATING VISIBILITY OF A BLIND SPOT TO A DRIVER

CROSS-REFERENCE TO RELATED APPLICATION

This application claims the benefit of U.S. Provisional Patent Application No. 61/748,104, filed Jan. 1, 2013, which is hereby incorporated by reference herein in its entirety.

TECHNICAL FIELD

The disclosed subject matter relates to systems for indicating visibility of a blind spot to a driver.

BACKGROUND

Side impact crashes often occur when a driver changes lanes or turns when an object such as a car, motorcycle, bicycle, etc., is in the driver's blind spot. Many drivers adjust the side mirrors of a vehicle such that the sides of the vehicle are reflected by an inside (i.e., a side nearest the vehicle) edge of the mirror. This often leaves a large blind spot in which an object, such as another vehicle may be hidden. For example, this blind spot can be located between portions of the area surrounding the vehicle that can be viewed in the mirrors of the vehicle, and portions of the area surrounding the vehicle that can be viewed by the driver using only relatively small head movements (e.g., movements that allow a driver to look through the windshield and some areas visible through the front door windows). The presence of this blind spot can lead to crashes when a driver fails to check the blind spot prior to maneuvering the vehicle.

Many solutions have been proposed to solve problems created by this blind spot. Many drivers turn their head to check the blind spot prior to, for example, changing lanes, which can increase a risk of colliding with an object in front of the vehicle that unexpectedly stops or enters the vehicle's path. Convex or aspherical mirrors that have a larger field of view have also been used to reduce an area of the blind spot that is not visible in the mirrors of the vehicle. However, these convex mirrors have other shortcomings, such as increasing drag, being aesthetically displeasing to some, reducing an area of another mirror (e.g., if applied to the surface of a side mirror), and not being approved for use as a sole side mirror (e.g., using a convex mirror as a side mirror may not comply with regulations of a particular jurisdiction). Using a video camera that captures video of the blind spot and a display to present that video has also been proposed. This can be very expensive. Adjusting side mirrors to a particular angle to show what would otherwise be a blind spot has also been proposed. However, correctly aligning the mirrors to accomplish this can be difficult, and many driver's may be uncomfortable with mirrors in these positions, or may not trust that the mirrors truly show the blind spot.

Therefore, there is a need for systems for indicating visibility of a blind spot to a driver.

SUMMARY

In accordance with various embodiments of the disclosed subject matter, systems for indicating visibility of a blind spot to a driver are provided.

In accordance with some embodiments of the disclosed subject matter, a side mirror assembly is provided, comprising: a housing; a mirror coupled to the housing, wherein the mirror is adjustable in at least a horizontal direction with respect to the housing; and a directional light source rigidly coupled to the housing such that a direction of the light source is substantially parallel to at least a portion of a typical driver's blind spot during operation of a vehicle to which the side mirror assembly is coupled, wherein the direction of the light source is angled with respect to the housing such that light emitted by the light source is reflected by the mirror into a passenger compartment of the vehicle to which the side mirror assembly is coupled in at least two positions of the mirror separated by at least ten degrees of horizontal rotation of the mirror.

In some embodiments, the side mirror further comprises a second directional light source rigidly coupled to the housing such that a direction of the second light source is substantially parallel to at least a second portion of the typical driver's blind spot during operation of the vehicle to which the side mirror assembly is coupled.

In some embodiments, the portion of the typical driver's blind spot substantially coincides with a first border of the blind spot and the second portion of the typical driver's blind spot substantially coincides with a second border of the blind spot.

In some embodiments, the directional light source comprises a light emitting diode and a lens.

In some embodiments, the direction light source emits at least a first color of light.

In some embodiments, the first color is blue.

In some embodiments, the light emitted by the directional light source is emitted as a cone having an optical axis.

In accordance with some embodiments of the disclosed subject matter, a side mirror assembly is provided, comprising: a housing; a mirror coupled to the housing, wherein the mirror is adjustable in at least a horizontal direction with respect to the housing; and a light source rigidly coupled to the housing such that a predominant direction of light emitted by the light source is toward the surface of the mirror at an angle of between fifteen and eighteen degrees with respect to a longitudinal axis of a vehicle when the housing is coupled to the vehicle in an operative position.

In some embodiments, the side mirror assembly further comprises a second light source rigidly coupled to the housing such that predominant direction of light emitted by the light second source is toward the surface of the mirror at an angle of about forty degrees with respect to the longitudinal axis of a vehicle when the housing is coupled to the vehicle in an operative position.

In some embodiments, the light source is a directional light source.

In some embodiments, the light source comprises a light emitting diode and a lens having an optical axis that defines a directionality of the light source.

In some embodiments, the light source emits at least a first color of light.

In some embodiments, the first color is blue.

In some embodiments, the light source emits a second color of light, and wherein the second color is orange.

In some embodiments, the light emitted by the light source is emitted as a cone having an optical axis.

In some embodiments, the light source operates with a first brightness when ambient brightness is greater than a threshold, and operates with a second lower brightness when ambient brightness is less than a threshold.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms for indicating visibility of a blind spot to a driver are provided.

In some embodiments, one or more light sources can be coupled to a housing and/or a frame of a side mirror of a vehicle. The light source (or light sources) can be a directional light source that emits light predominantly in a particular direction, which can be accomplished using any suitable light source and/or any suitable technique or techniques.

In some embodiments, the light source can be affixed to the mirror housing in a configuration where the light emitted from the light source is emitted along a direction that is generally aligned with at least a portion of a typical blind spot. The light can then shine on the mirror as though it were an object in the blind spot. During operation of the vehicle, the driver can check a mirror that includes the mechanisms described herein, and if the driver observes the light emitted by the light source in the mirror, the driver can be assured that the driver is viewing the blind spot in that mirror.

The blind spot of a vehicle may vary based on various factors such as the vehicle's geometry, the location of the side mirrors, the alignment of the mirrors, and any other suitable factors. Additionally, the blind spot of different drivers may also vary based on the height of the driver's eyes, positioning of the driver's seat, height of the driver's seat, posture of the driver, and/or any other suitable factors. Accordingly, a particular portion of the mirror at which the light source of the mechanisms described herein is directed can be set based on any suitable factors, such as the geometry of a particular vehicle, the placement of the mirrors, the size and/or shape of the mirror, the height of a typical (or average) driver, etc. More particularly, a manufacturer or other entity using the mechanisms described herein can define the blind spot in any manner of their choosing, and can determine a particular portion of the mirror at which the light source of the mechanisms described herein is directed based on that definition. In some embodiments, a manufacturer of a vehicle can incorporate the mechanisms described herein when designing the vehicle and can set the angles at which the light source shines on the mirror.

In some embodiments, a mirror incorporating the mechanisms described herein can be adjusted to various positions while maintaining functionality of the mechanisms. For example, if the light source is rigidly affixed to a portion of the vehicle that maintains a consistent relationship to the vehicle (e.g., a mirror housing with a position that does not change during operation of the vehicle), the mirror can be adjusted with respect to the vehicle (e.g., based on a driver's preferences) and the light can still be used to indicate whether the blind spot is visible.

Figure 1:
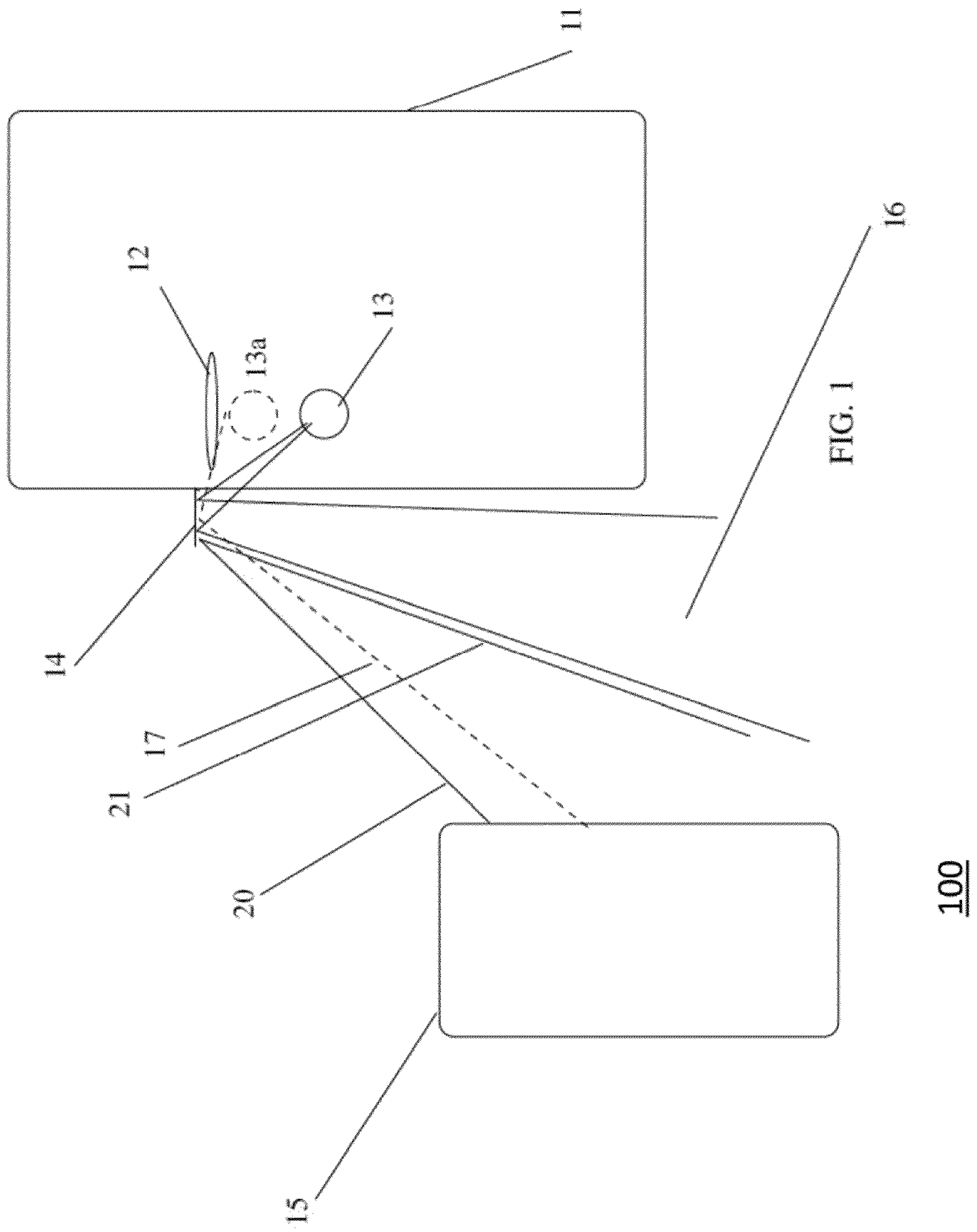
FIG. 1 shows an example a simplified diagram showing a vehicle and a blind spot of a driver of the vehicle in accordance with some embodiments of the disclosed subject matter.

Turning to FIG. 1, an example 100 of a simplified diagram showing a vehicle and a blind spot of a driver of the vehicle is provided in accordance with some embodiments of the disclosed subject matter. As illustrated, a vehicle 11 can be operated by a driver 13 positioned behind a steering wheel 12, in some embodiments. Vehicle 11 can also be equipped with a side mirror 14 (sometimes referred to as a wing mirror, door mirror, side-view mirror, fender mirror, or any other suitable moniker), which driver 13 can use to view a portion of the area around vehicle 11, in some embodiments. Although not shown in diagram 100, vehicle 11 can be equipped with a rear-view mirror, another side mirror, and/or any other suitable equipment that can be used by driver 13 to view portions of the area around vehicle 11, in some embodiments.

In some embodiments, mirror 14 can be any suitable size and can have any suitable optical properties. For example, a manufacturer of a vehicle, such as vehicle 11, can equip the vehicle with a mirror, such as mirror 14, having a certain size and/or optical properties based on various considerations. As another example, an owner of a vehicle or any other suitable party, can replace a mirror provided by the manufacturer of the vehicle with a so-called aftermarket product, or any other suitable mirror. Any suitable considerations may be taken into account when determining a size of a mirror to use as a side mirror for a particular vehicle. For example, design considerations can be taken into account by a manufacturer of a vehicle (or other suitable party) when determining a size of a mirror to user as mirror 14. As another example, regulatory requirements can be taken into account by a manufacturer of the vehicle (or other suitable party) when determining a size of a mirror to use as mirror 14. As yet another example, a size of the vehicle and/or visibility from a driving position of the vehicle can be taken into account by a manufacturer of a vehicle (or other suitable party) when determining a size of a mirror to use as mirror 14. Any other suitable considerations or combinations of considerations can be taken into account when determining a size of mirror to use as mirror 14. Similar considerations can be taken into account when determining optical properties of mirror 14, such as a curvature of mirror 14, a reflectivity of mirror 14, etc. Diagram 100 shows mirror 14 as having a substantially planar surface such that objects in mirror 14 appear with unit magnification and without substantial distortion. However, mirror 14 can have other shapes that can cause mirror 14 to exhibit different optical properties. For example, a reflective surface of mirror 14 can have a convex shape, which can have a larger field of view than a planar mirror, but can also cause distortion of reflected images. As another example, a reflective surface of mirror 14 can have an aspheric curvature, which can be provide a larger field of view than a planar surface with less distortion than a convex shaped mirror, depending on a particular profile of the aspheric curvature. In some embodiments, mirror 14 can include portions with different curvatures, such as a planar portion and an aspheric portion.

In some embodiments, mirror 14 can be coupled to a body of vehicle 11 such that mirror 14 sticks out to the side of vehicle 11 during operation of vehicle 11. Any suitable technique or techniques can be used to couple mirror 14 to the body of vehicle 11. For example, mirror 14 can be coupled to a mirror housing, which can, in turn, be mounted to vehicle 11.

In some embodiments, mirror 14 can be adjustable such that it can be positioned at various angles with respect to a body of vehicle 11. This can, for example, allow a driver to position mirror 14 at a desired angle. An angle at which mirror 14 is positioned may be based on various factors, such as a height of the eyes of driver 13, a height of a seat in which driver 13 sits during operation of vehicle 11, a position of the seat with respect the position of mirror 14 (e.g., how far back or forward the seat is positioned), a preferred field of view of driver 13, and/or any other suitable factor or factors.

In some embodiments, mirror 14 can be adjusted using any suitable technique or techniques. For example, a person, such as driver 13, can manually adjust an angle of mirror 14. As another example, vehicle 11 can include mechanical and/or electronic controls that can be used to adjust an angle of mirror 14 with respect to vehicle 11.

As shown in diagram 100, mirror 14 can be positioned at an angle such that, during operation of vehicle 11, driver 13 can see objects in a field of view 16 reflected from mirror 14 when looking at mirror 14 from a normal operating position of driver 13. When mirror 14 is positioned to reflect field of view 16 as shown in diagram 100, an object 15 (such as another vehicle) can be positioned such that object 15 is not visible within field of view 16, or any other field of view readily visible to driver 13 (e.g., a field of view of a rear-view mirror, the driver's field of view, etc.) without, for example, turning his or her head to look for objects that might be located in a blind spot. However, turning to look at a blind spot can be dangerous as driver 13 may not see a vehicle in front of vehicle 11 slowing down, or another object may move into a path of vehicle 11 unexpectedly. Driver 13 can, instead of turning to look at a blind spot, lean forward and glance at mirror 14 in order to check the driver side blind spot. For example, leaning forward changes a field of view visible to driver 13 in mirror 14 by changing an angle between driver 13 and mirror 14.

As shown in diagram 100, when driver 13 leans forward and glances at mirror 14 (e.g., as shown by position 13*a*), at least a portion of object 15 can be seen (e.g., driver 13 can observe light 17 reflected off object 15 and, in turn, reflected from mirror 14).

In some embodiments, an object, such as object 15, located within an area defined in diagram 100 by line segments 20 and 21 can be considered to be in a blind spot of driver 13 when driver 13 is in a normal operating position. Note that, in reality, the blind spot is a three dimensional volume, but an area is used in this description to explain the mechanisms described herein. Line segments 20 and 21 can define the edges of the blind spot at a particular level, such as a level of the center (vertically) of mirror 14, or any other suitable level. As described below in connection with FIGS. 2-5, the mechanisms described herein can indicate to driver 13 when objects in the driver's blind spot are visible in mirror 14. For example, in some embodiments, one or more light sources can be positioned such that at least a portion of the light emitted by the one or more light sources is directed toward mirror 14 at an angle that is substantially aligned with an angle of line segment 20 and/or line segment 21. In a more particular example, one or more light sources can be positioned such that light emitted from the light source(s) strikes the surface of mirror 14 at an angle that is substantially aligned with line segment 20 and/or line segment 21 and at a point at which line segment 20 and/or line segment 21 intersects the surface of mirror 14. As another example, one or more light sources can be positioned such that light emitted by the one or more light sources is directed toward mirror 14 at an angle that is substantially aligned with an angle between line segment 20 and line segment 21, such as a center of a blind spot. As yet another example, one or more light sources can be positioned such that light emitted by the one or more light sources is directed toward mirror 14 such that the light is reflected into a passenger compartment of vehicle 11 for various angles of the mirror with respect to driver 13, vehicle 11 and/or housing 19. In a more particular example, light emitted by the one or more light sources and reflected by mirror 14 can be reflected into the passenger compartment at two positions of mirror 14 separated by at least twenty degrees in a horizontal direction. In another more particular example, the one or more light sources can be positioned such that, during operation of vehicle 11, light emitted by the light source light emitted by the one or more light sources is directed toward mirror 14 at an angle of about forty degrees with respect to a longitudinal axis of vehicle 11. The light source aimed at an angle of about forty degrees can, for example, coincide with a leading edge of the blind spot of a typical driver. In another more particular example, the one or more light sources can be positioned such that, during operation of vehicle 11, light emitted by the light source light emitted by the one or more light sources is directed toward mirror 14 at an angle of between fifteen and eighteen degrees with respect to the longitudinal axis of vehicle 11. The light source aimed at an angle of between fifteen and eighteen degrees can, for example, coincide with a trailing edge of the blind spot of a typical driver. Note that FIG. 1 is not drawn to scale (e.g., a size of vehicle 11, driver 13, angles between driver 13 and mirror 14, angles between mirror 14, object 15 and line segments 20 and 21, etc.), but is merely illustrative of the mechanisms described herein. A blind spot of a driver, such as driver 13, can be located in any suitable location and, as described above, can vary based on various factors.

Figure 2:
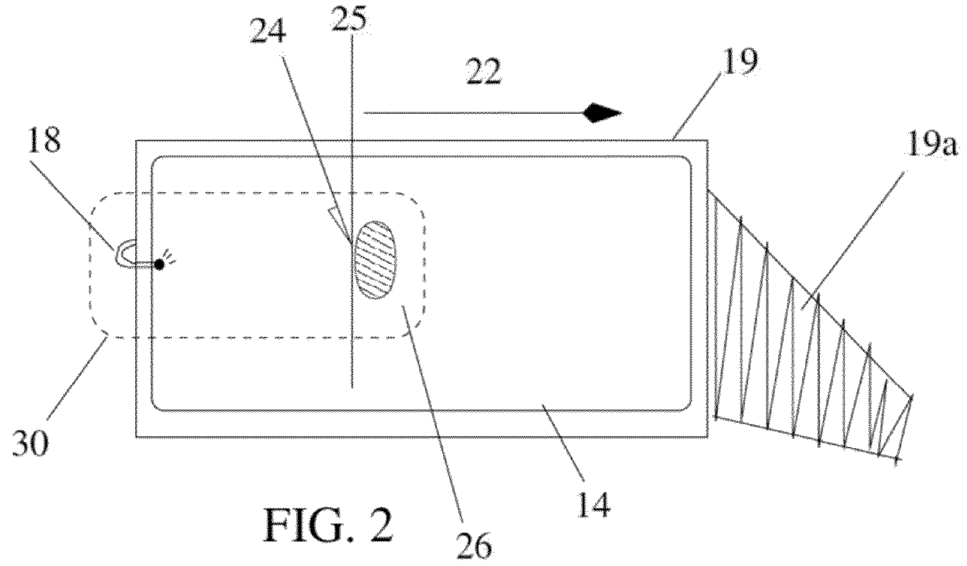
FIG. 2 shows an example of a view of a side mirror and a light source for indicating visibility of a blind spot to a driver in accordance with some embodiments of the disclosed subject matter.

FIG. 2 shows an example of a view of a side mirror and a light source for indicating visibility of a blind spot to a driver in accordance with some embodiments of the disclosed subject matter. As shown in FIG. 2, mirror 14 can be installed within a housing 19 which can be coupled to a body of a vehicle, such as vehicle 11, by section 19*a*. As described above in connection with FIG. 1, mirror 14 can be adjustable within housing 19. Additionally, in some embodiments, housing 19 can be coupled to vehicle 11 such that housing 19 has a fixed relationship to the body of vehicle 19 during operation. Note that some side mirrors can be folded toward the body of the vehicle to which they are coupled to avoid the mirror being damaged (e.g., when the vehicle is parked). However, as described herein such a folded state is not considered an operational state of the mirror.

In some embodiments, a light source 18 can be coupled to housing 19. Any suitable technique or techniques can be used to couple light source 18 to housing 19. For example, light source 18 can be coupled to housing 19 mechanically (e.g., using a mechanical fastener). As another example, light source 18 can be coupled to housing 19 using an adhesive and/or other material for affixing light source 18 to housing 19. As yet another example, light source 18 can be inserted in a receptacle that is coupled to and/or is integrally formed as part of housing 19. As yet another example, light source 18 can be coupled to housing 19 when forming housing 19 (e.g., at a time when housing 19 is being molded or otherwise created).

In some embodiments, light source 18 can be a directional light source having an optical axis that defines the directionality. For example, light source 18 can include a light emitting diode (LED) and any suitable optics that emits light along an optical axis. The optical axis of this light source can be a center of a cone or the like, of light emitted by the LED. As another example, light source 18 can include optical fibers and/or any other suitable optics for receive light at one end from a light source (such as an LED, laser, etc.) and emitting that light at light source 18. Each optical fiber of light source 18, in this example, can have a separate optical axis defined by a direction along which the most light is directed from an end of the optical fiber. Additionally or alternatively, light source 18 can include a lens that directs light emitted from a group of optical fibers and directs the light in a direction defined by an optical axis of the lens.

In some embodiments, light source 18 can be generally directional without having an optical axis. For example, light source 18 can emit light in a general direction, and rays emitted from light source 18 may go in the same general direction without there being symmetry along some optical axis. For example, light source 18 can emit light in an asymmetrical pattern.

In some embodiments, light source 18 can be coupled to housing 19 such that light emitted by light source 18 is emitted at an angle with respect to housing 19 that is substantially aligned with line segment 20 or line segment 21. For example, if light source 18 is a directional light source, light source 18 can be coupled to housing 19 such that a general direction of light emitted by light source 18 is directed along a path that generally coincides with line segment 20 or 21.

In some embodiments, at least one direction in which light source 18 emits light (e.g., a direction of a directional light source, an optical axis of the light source, etc.) can be towards a point that is just to the right of point 24 at which line segment 20 intersects a surface of mirror 14. For example, point 24 can be used as a reference point for determining a direction in which light source 18 should be aimed. Light source 18 can then be coupled to housing 19 such that light source 18 directs light in the determined direction based on reference point 24. Note that a location of point 24 on a surface of mirror 14 can be dependent on an angle at which mirror 14 is set with respect to light source 18. Alternatively, at least a portion of light emitted by light source 18 can be directed towards point 24 and/or to the left of point 24. Line 25 as illustrated in FIG. 2 passes through point 24 parallel to a surface of mirror 14 (e.g., in embodiments where mirror 14 is a planar mirror). Note that line 25 is shown for explanation only and does not necessarily represent a line visible on mirror 14 during operation of vehicle 11.

In some embodiments, light emitted by light source 18 can be directed such that the light is reflected by mirror 14 near a region shown in FIG. 2 as shaded area 26. In some embodiments, for various angles of mirror 14 with respect to vehicle 11 (an angle between mirror 14 and a longitudinal axis of vehicle 11) light emitted by light source 18 and reflected by mirror 14 can be reflected into the passenger compartment. Shaded area 26 can begin near a point on a vehicle side of line 25, which in FIG. 2 can be in a direction indicated by arrow 22. In such embodiments, if driver 13 can see light emitted by light source 18 reflected by mirror 14 this can indicate to driver 13 that at least a portion of the driver has moved through a position in which the blind spot is visible in mirror 14. Additionally, in some embodiments, for various angles of mirror 14 with respect to driver 13, vehicle 11 and/or housing 19, because the angle of light source 18 is fixed with respect to housing 19, a relationship between light emitted from light source 18 and the blind spot can be maintained. Additionally, over a range of angles of mirror 14, light emitted by light source 18 can be reflected by mirror 14 into the passenger compartment of vehicle 11. In some embodiments, light emitted by light source 18 and reflected by mirror 14 can cross a longitudinal axis defined by, for example, a forward facing direction of a driver seat, at a point between a position of driver 13 when the driver's seat is moved all the way back and a position of steering wheel 12 (or a position at which steering wheel 12 is in a typical vehicle). For example, light source 18 can be positioned such that light is reflected by mirror 14 into the passenger compartment over a wide range of operative angles of mirror 14 with respect to driver 13, vehicle 11 and/or housing 19. In a more particular example, these operative angles can be angles of mirror 14 which allow driver 13 to see at least a portion of the area surrounding vehicle 11 of which the driver should be aware while driving. Note that, although shaded area 26 is described as starting at line 25, it can be located at any suitable position near where an edge of a blind spot begins in order to indicate to the driver that at least a portion of the blind spot is visible. In some embodiments, light source 18 can be directed such that light reflected in mirror 18 is not visible at position 13*a* if the mirror is angled so that objects that are relatively low to the ground, such as motorcycles, small cars, bicycles, go karts, or any other object that may be lower to the ground than mirror 14 are not visible in mirror 14 at position 13*a*.

In some embodiments, light that is emitted by light source 18 can have any suitable properties to allow the light to be noticeable to driver 13 regardless of ambient conditions. For example, light source 18 can be implemented as a light source that emits a color and/or intensity of light that is noticeable to most people in a wide variety of conditions such as during daytime on a clear day, during daytime on a cloudy day, during nighttime, etc. In a more particular example, light source 18 can emit light that is red, orange, blue, or any other suitable color.

Additionally or alternatively, in some embodiments, light source 18 can be controlled such that a color and/or intensity of light emitted by light source 18 is adjusted based on ambient conditions. For example, light source 18 can emit a first color of light when ambient brightness is over a threshold, and can emit a second color of light when ambient brightness is below the threshold. As another example, light source 18 can emit more light and/or more intensity of light when ambient brightness is over a threshold, and can emit less light and/or less intensity of light when ambient brightness is below the threshold. Any suitable technique or techniques can be used to determine ambient conditions such as using light sensors, a timer, querying a service (e.g., a weather service) to determine ambient conditions at a location of the vehicle, etc. As yet another example, light source 18 can emit more light and/or more intensity of light when the headlights of vehicle 11 are turned off, and can emit less light and/or less intensity of light when the headlights of vehicle 11 are turned on.

In some embodiments, light source 18 can emit light continuously while vehicle 11 is in an operational state. For example, if vehicle 11 is a car, when the car is running, power can be provided to light source 18 and light source 18 can emit light. As another example, if vehicle 11 is an electric vehicle, when the electric vehicle is in an ON state, power can be provided to light source 18 and light source 18 can emit light. Additionally or alternatively, an amount and/or intensity of light emitted by light source 18 can change based on one or more criteria. For example, a controller (not shown) can cause light source 18 to emit more and/or more intense light when a turn signal of vehicle 18 is activated. In a more particular example, in an embodiment as shown in FIG. 2, the controller can cause light source 18 to emit more and/or more intense light when a left turn signal of vehicle 11 is activated. As another example, one or more sensors can be used to determine a position of driver 13, and the controller can cause light source 18 to emit more and/or more intense light when driver 13 moves within a particular distance of the sensor (e.g., when driver 13 leans forward to be less than a particular distance from, for example, steering wheel 12). In some embodiments, light source 18 can emit no light when one or more criterion for emitting light by light source 18 is not met. Although light source 18 is described as emitting more and/or more intense light when one or more criterion are met, other properties of light emitted by light source 18 can be altered, such as a color, a shape, and/or any other suitable property of light emitted by light source 18.

In some embodiments, light source 18 can be implemented such that the light emitted by light source 18 does not interfere with viewing objects (such as object 15) in mirror 14. For example, light source 18 can be implemented such that the light is diffuse and will not interfere with a driver's ability to see objects in mirror 14 and/or will not be dangerous or distracting to driver 13 (e.g., by shining a bright light in the eyes of driver 13). As another example, light source 18 can be implemented such that the light is not above a certain brightness and is less likely to interfere with a driver's ability to see objects in mirror 14 and/or will not be dangerous or distracting to driver 13. As yet another example, the size and/or shape of the light source 18 can be relatively small in comparison to the size of the mirror and is less likely to interfere with a driver's ability to see objects in mirror 14 and/or will not be dangerous or distracting to driver 13.

Figure 3:
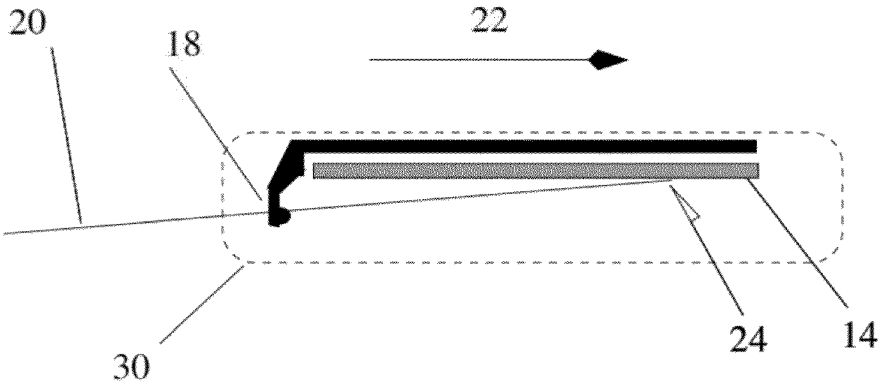
FIG. 3 shows an example of a plan view of a portion of FIG. 2 surrounded by a dashed line in accordance with some embodiments of the disclosed subject matter.

FIG. 3 shows an example of a plan view of a portion of FIG. 2 surrounded by dashed line 30 in accordance with some embodiments of the disclosed subject matter. As shown in FIG. 3, line segment 20 can intersect mirror 14 at reference point 24. As described above in connection with FIG. 2, light source 18 can be directed in a direction that generally coincides with line segment 20 shown in FIG. 3. In a more particular example, line segment 20 can pass through light source 18 and intersect with a surface of mirror 14 at point 24. Note that FIGS. 2 and 3 are not drawn to scale (e.g., a size of mirror 14, a size of housing 19, a size and position of light source 18, angles between light source 18 and mirror 14, angles between mirror 14 and line segment 20, etc.), but is merely illustrative of the mechanisms described herein. A blind spot of a driver, such as driver 13, can be located in any suitable location and, as described above, can vary based on various factors.

Figure 4:
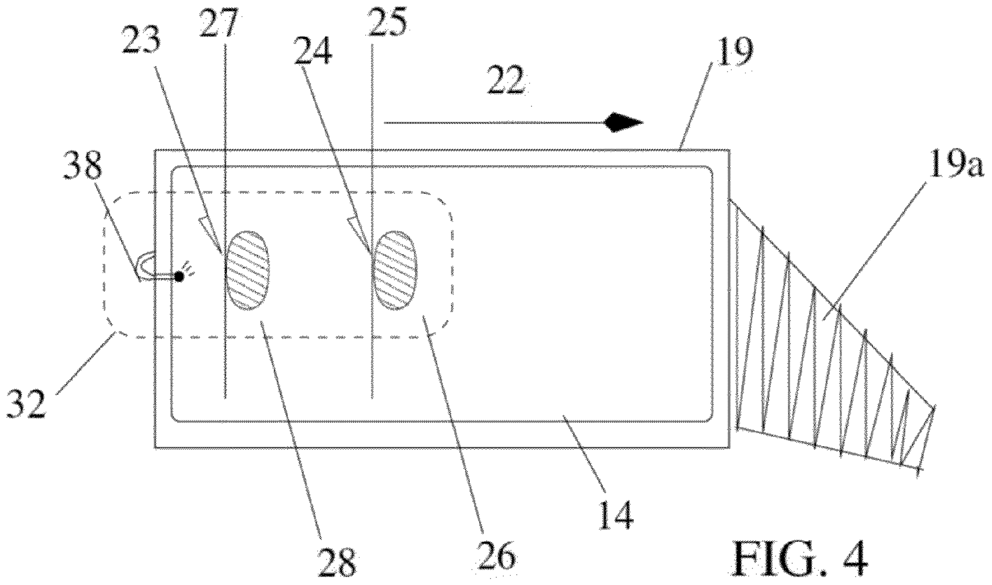
FIG. 4 shows an example of a view of a side mirror and a light source with multiple lights for indicating visibility of a blind spot to a driver in accordance with some embodiments of the disclosed subject matter.

FIG. 4 shows an example of a view of a side mirror and a light source with multiple lights for indicating visibility of a blind spot to a driver in accordance with some embodiments of the disclosed subject matter. In some embodiments, side mirror 14 and a light source 38 shown in FIG. 4 can be similar to side mirror 14 and light source 18 as shown in FIG. 2, and can provide additional light that indicates when another portion of the blind spot is visible to driver 13 in side mirror 14.

In some embodiments, light source 38 can emit light in multiple directions toward different portions of a surface of mirror 14. Any suitable technique or techniques can be used to emit light from light source 38 toward different portions of mirror 14. For example, light source 38 can include at least two different sources of light (e.g., two LEDs) that are aimed in different directions. As another example, light source 38 can include optics for directing light toward different portions of mirror 14.

In some embodiments, a first direction in which light source 38 emits light (e.g., a direction of a directional light source, an optical axis of the light source, etc.) can be towards a point that is just to the right of point 24 at which line segment 20 intersects the surface of mirror 14, and a second direction in which light source 38 directs light can be towards a point that is just to the right of a point 23 at which line segment 21 intersects the surface of mirror 14. For example, points 23 and 24 can be used as a reference point for determining directions in which light source 38 should be aimed. Note that a location of points 23 and 24 on a surface of mirror 14 can be dependent on an angle at which mirror 14 is set with respect to light source 38. Alternatively, at least a portion of light emitted by light source 38 can be directed towards points 23 and/or 24 and/or to the left of points 23 and/or 24. Light source 38 can then be coupled to housing 19 such that light source 38 directs light in the determined directions based on reference points 23 and 24. Line 27, as illustrated in FIG. 4, passes through point 23 parallel to a surface of mirror 14 (e.g., in embodiments where mirror 14 is a planar mirror). Note that line 27 is shown for explanation only and does not necessarily represent a line visible on mirror 14 during operation of vehicle 11. In some embodiments, point 23 and/or point 24 can generally coincide with a border of a blind spot when driver 13 is in a normal operating position.

In some embodiments, light emitted by light source 38 can be directed such that the light is reflected by mirror 14 near regions shown in FIG. 4 as shaded area 26 and shaded area 28. As described above in connection with FIG. 2, shaded area 26 can begin near point on a vehicle side of line 25, which in FIGS. 2 and 4 can be in a direction indicated by arrow 22. Shaded area 28 can begin near a point on a vehicle side of line 27, which in FIGS. 2 and 4 can be in a direction indicated by arrow 22. In such embodiments, if driver 13 can see (or has seen) both areas of light emitted by light source 38 and reflected by mirror 14, this can indicate to driver 13 that a substantial portion of the blind spot (e.g., most of the blind spot, all of the blind spot, etc.) is also visible in mirror 14. Additionally, in some embodiments, for various angles of mirror 14 with respect to driver 13, vehicle 11 and/or housing 19, because the angle of light source 38 is fixed with respect to housing 19, a relationship between light emitted from light source 38 and the blind spot can be maintained. Note that, although shaded areas 26 and 28 are described as starting at lines 25 and 27 respectively, they can be located at any suitable position near where edges of a blind spot begins in order to indicate to the driver that at least a portion of the blind spot is visible.

In some embodiments, light emitted by light source 38 toward shaded area 26 can be distinguishable from light emitted toward shaded area 28. For example, light emitted toward shaded area 26 can be a first color, and light emitted toward shaded area 28 can be a second color. As another example, light emitted toward shaded area 26 can be emitted with a first pattern, and light emitted toward shaded area 28 can be emitted with a second pattern. Differentiating between the light emitted toward shaded area 26 and shaded area 28 can indicate to the driver when both edges of the blind spot can be seen and/or have been seen. Although shown as distinct areas, in some embodiments, a portion of shaded areas 26 and 28 can overlap based on an angle or angles of the light emitted by light source 38, a shape in which the light is emitted from light source 38, and/or any other suitable factors.

Figure 5:
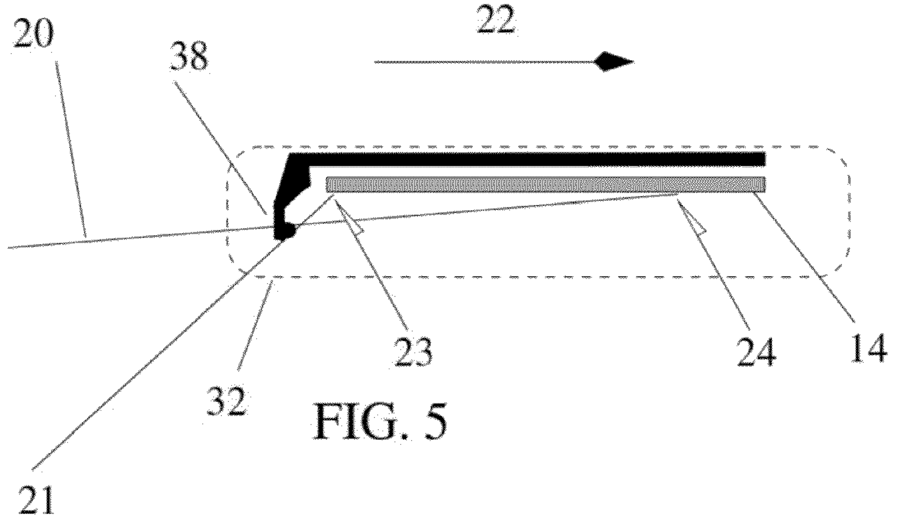
FIG. 5 shows an example of a plan view of a portion of FIG. 4 surrounded by a dashed line in accordance with some embodiments of the disclosed subject matter.

FIG. 5 shows an example of a plan view of a portion of FIG. 4 surrounded by dashed line 32 in accordance with some embodiments of the disclosed subject matter. As shown in FIG. 5, line segment 20 can intersect mirror 14 at reference point 24 and line segment 21 can intersect mirror 14 at reference point 23. As described above in connection with FIG. 4, light source 38 can be directed in a direction that generally coincides with line segments 20 and 21 shown in FIG. 5. In a more particular example, line segments 20 and 21 can pass through light source 38 and intersect with a surface of mirror 14 at points 23 and 24. Note that, although light source 38 is shown as being coupled to mirror 14 in FIG. 5, this is merely shown for simplicity and light source 38 can remain in a fixed position when and if an angle of mirror 14 is adjusted. Note that FIGS. 4 and 5 are not drawn to scale (e.g., a size of mirror 14, a size of housing 19, a size and position of light source 38, angles between light source 38 and mirror 14, angles between mirror 14 and line segments 20 and 21, etc.), but is merely illustrative of the mechanisms described herein. A blind spot of a driver, such as driver 13, can be located in any suitable location and, as described above, can vary based on various factors.

Although the mechanisms described herein have generally been described in connection with a planar side mirror on a left side of a vehicle that is also a driver side of the vehicle, the mechanisms described herein can be applied to other uses. For example, the mechanisms described herein can be used with non-planar mirrors. As another example, the mechanisms described herein can be adapted to be used on a driver side mirror on a right side of a vehicle. As yet another example, the mechanisms described herein can be adapted to be used on a passenger side mirror.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

It should be noted that, as used herein, the term mechanism can encompass hardware, software, firmware, or any suitable combination thereof.

Accordingly systems for indicating visibility of a blind spot to a driver are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed:

1. A side mirror assembly, comprising:

a housing;

a mirror coupled to the housing, wherein the mirror is adjustable in at least a horizontal direction with respect to the housing; and a directional light source rigidly coupled to the housing such that a direction of the light source is substantially parallel to at least a portion of a typical driver's blind spot during operation of a vehicle to which the side mirror assembly is coupled, wherein the direction of the light source is angled with respect to the housing such that light emitted by the light source is reflected by the mirror into a passenger compartment of the vehicle to which the side mirror assembly is coupled in at least two positions of the mirror separated by at least ten degrees of horizontal rotation of the mirror.

2. The side mirror assembly of claim 1, further comprising a second directional light source rigidly coupled to the housing such that a direction of the second light source is substantially parallel to at least a second portion of the typical driver's blind spot during operation of the vehicle to which the side mirror assembly is coupled.

3. The side mirror assembly of claim 2, wherein the portion of the typical driver's blind spot substantially coincides with a first border of the blind spot and the second portion of the typical driver's blind spot substantially coincides with a second border of the blind spot.

4. The side mirror assembly of claim 1, wherein the directional light source comprises a light emitting diode and a lens.

5. The side mirror assembly of claim 1, wherein the direction light source emits at least a first color of light.

6. The side mirror assembly of claim 5, wherein the first color is blue.

7. The side mirror assembly of claim 1, wherein the light emitted by the directional light source is emitted as a cone having an optical axis.

8. A side mirror assembly, comprising:

a housing;

a mirror coupled to the housing, wherein the mirror is adjustable in at least a horizontal direction with respect to the housing; and a light source rigidly coupled to the housing such that a predominant direction of light emitted by the light source is toward the surface of the mirror at an angle of between fifteen and eighteen degrees with respect to a longitudinal axis of a vehicle when the housing is coupled to the vehicle in an operative position.

9. The side mirror assembly of claim 8, further comprising a second light source rigidly coupled to the housing such that predominant direction of light emitted by the light second source is toward the surface of the mirror at an angle of about forty degrees with respect to the longitudinal axis of a vehicle when the housing is coupled to the vehicle in an operative position.

10. The side mirror assembly of claim 8, wherein the light source is a directional light source.

11. The side mirror assembly of claim 10, wherein the light source comprises a light emitting diode and a lens having an optical axis that defines a directionality of the light source.

12. The side mirror assembly of claim 8, wherein the light source emits at least a first color of light.

13. The side mirror assembly of claim 12, wherein the first color is blue.

14. The side mirror assembly of claim 12, wherein the light source emits a second color of light, and wherein the second color is orange.

15. The side mirror assembly of claim 8, wherein the light emitted by the light source is emitted as a cone having an optical axis.

16. The side mirror assembly of claim 8, wherein the light source operates with a first brightness when ambient brightness is greater than a threshold, and operates with a second lower brightness when ambient brightness is less than a threshold.

* * * * *

UNITED STATES PATENT AND TRADEMARK OFFICE

CERTIFICATE OF CORRECTION

PATENT NO. : 8,783,920 B1
APPLICATION NO. : 14/146200
DATED : July 22, 2014
INVENTOR(S) : Shahriar Mokhtari Sharghi It is certified that error appears in the above-identified patent and that said Letters Patent is hereby corrected as shown below:

On the Title Page Items (71) and (72), Applicant/Inventor's name, "Shahriar Mohktari Sharghi" should be -- Shahriar Mokhtari Sharghi --.

Signed and Sealed this
Tenth Day of March, 2015

Michelle K. Lee
*Deputy Director of the United States Patent and Trademark Office*